US012679937B2

(12) United States Patent
Gallucci et al.

(10) Patent No.: US 12,679,937 B2
(45) Date of Patent: Jul. 14, 2026

(54) REINFORCED POLYESTER STRUCTURAL COMPONENTS

(71) Applicant: SABIC GLOBAL TECHNOLOGIES B.V., Bergen Op Zoom (NL)

(72) Inventors: Robert Russell Gallucci, Mt. Vernon, IN (US); Vikram K. Daga, Evansville, IN (US); Curtis Collar, Pittsfield, MA (US); Dinesh Munjurulimana, Farmington Hills, MI (US); Fred Chang, Wixom, MI (US); Abderrahim AF Fakiri, Agawam, MA (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 18/745,204

(22) Filed: Jun. 17, 2024

(65) Prior Publication Data
US 2024/0336750 A1 Oct. 10, 2024

Related U.S. Application Data

(62) Division of application No. 17/049,662, filed as application No. PCT/US2019/031520 on May 9, 2019, now abandoned.

(60) Provisional application No. 62/670,400, filed on May 11, 2018.

(51) Int. Cl.
| | |
|---|---|
| *C08L 67/02* | (2006.01) |
| *C08J 5/04* | (2006.01) |
| *C08J 5/24* | (2006.01) |

(52) U.S. Cl.
CPC ............. *C08J 5/0405* (2021.05); *C08J 5/042* (2013.01); *C08J 5/043* (2013.01); *C08J 5/244* (2021.05); *C08J 5/249* (2021.05); *C08L 67/02* (2013.01); *C08J 2367/00* (2013.01); *C08J 2367/02* (2013.01); *C08J 2367/04* (2013.01); *C08J 2467/00* (2013.01); *C08J 2467/02* (2013.01)

(58) Field of Classification Search
CPC ............. C08J 5/04; C08J 5/0405; C08L 67/02
See application file for complete search history.

(56) References Cited

U.S. PATENT DOCUMENTS

| | | | | |
|---|---|---|---|---|
| 3,953,394 | A | * 4/1976 | Fox | C08L 67/02 |
| | | | | 524/412 |
| 4,564,658 | A | 1/1986 | Liu | |
| 4,704,417 | A | 11/1987 | Bonin et al. | |
| 5,496,880 | A | 3/1996 | Heuseveldt et al. | |
| 6,040,250 | A | 3/2000 | Paul et al. | |
| 8,900,502 | B2 | * 12/2014 | Taniguchi | F25B 27/00 |
| | | | | 264/320 |
| 2012/0153644 | A1 | 6/2012 | Bobba et al. | |

| | | | |
|---|---|---|---|
| 2012/0153647 | A1 | 6/2012 | Nagwanshi et al. |
| 2012/0153669 | A1 | 6/2012 | Nagwanshi et al. |
| 2012/0200098 | A1 | 8/2012 | Nagwanshi et al. |
| 2012/0200099 | A1 | 8/2012 | Nagwanshi et al. |
| 2012/0246873 | A1 | 10/2012 | Konduri et al. |
| 2012/0291941 | A1 | 11/2012 | Czopek et al. |
| 2012/0304445 | A1 | 12/2012 | Bobba et al. |
| 2013/0113226 | A1 | 5/2013 | Bobba et al. |
| 2013/0175128 | A1 | 7/2013 | Kumar et al. |
| 2013/0175813 | A1 | 7/2013 | Mana et al. |
| 2013/0193698 | A1 | 8/2013 | Nagwanshi et al. |
| 2013/0221691 | A1 | 8/2013 | Nagwanshi et al. |
| 2013/0313841 | A1 | 11/2013 | Mana et al. |
| 2014/0175816 | A1 | 6/2014 | Marur et al. |
| 2014/0203577 | A1 | 7/2014 | Nagwanshi et al. |
| 2014/0203592 | A1 | 7/2014 | Nagwanshi et al. |
| 2015/0192183 | A1 | 7/2015 | Muthu et al. |
| 2015/0367798 | A1 | 12/2015 | Bobba |

(Continued)

FOREIGN PATENT DOCUMENTS

| | | |
|---|---|---|
| CN | 107618241 A | 1/2018 |
| DE | 2749261 A1 | 5/1979 |
| JP | H06206223 A * | 7/1994 |

(Continued)

OTHER PUBLICATIONS

Chen et al. "PETcomposites improved both flame retardancy and mechanical properties by phosphorus-containing thermotropic liquid crystalline copolyester with aromatic ether moiety", Composites Science and Technology, Elsevier, Amsterdam, NL, vol. 72, No. 6, Jan. 14, 2012, pp. 649-655.

(Continued)

*Primary Examiner* — Vickey Nerangis

(74) *Attorney, Agent, or Firm* — CANTOR COLBURN LLP

(57) ABSTRACT

An article of manufacture comprising a polyester composition, the article comprising, as measured by differential scanning calorimetry with a heating rate of 20° C. per minute on first heating according to ASTM D3418, at least two different crystalline melting temperatures, wherein a first crystalline melting temperature and a second crystalline melting temperature are each independently 200-290° C.; and a first heat of fusion and a second heat of fusion that are each independently at least 3 J/g, preferably wherein a ratio of the first heat of fusion to the second heat of fusion is 1:5-5:1, wherein the polyester composition comprises a first polyester having a phosphorous content of greater than or equal to 20 ppm, a second polyester, and 5-50 weight percent of a plurality of fibers, based on the total weight of the polyester composition, wherein the plurality of fibers have a diameter of 5-25 micrometers.

8 Claims, 2 Drawing Sheets

(56)                References Cited

U.S. PATENT DOCUMENTS

2017/0129148 A1      5/2017   Dassen et al.
2017/0260389 A1      9/2017   Kagumba et al.

FOREIGN PATENT DOCUMENTS

JP        2004256809 A      9/2004
WO          8002430 A1     11/1980
WO        2010105787 A1      9/2010

OTHER PUBLICATIONS

International Search Report for International Application No. PCT/US2019/031520, International Filing Date May 9, 2019, Date of Mailing Jul. 25, 2019, 5 pages.
Jacques et al. "Reactions induced by triphenyl phosphite adidtion during melt mixing of poly(ethylene terephthalate)/ poly(butylene terephthalate) blends: influence of phosphite structure and polyester chain-end concentration", Polymer, Elsevier Science Publishers B.V., GB, vol. 37, No. 18, Sep. 1, 1996, pp. 4085-4097.
Written Opinion for International Application No. PCT/US2019/031520, International Filing Date May 9, 2019, Date of Mailing Jul. 25, 2019, 10 pages.

* cited by examiner

REINFORCED POLYESTER STRUCTURAL COMPONENTS

CROSS REFERENCE TO RELATED APPLICATIONS

This application is a Divisional of U.S. application Ser. No. 17/049,662, filed on Oct. 22, 2020, which is a National Stage Application of PCT/US2019/031520, filed May 9, 2019, which claims the benefit of U.S. Provisional Application No. 62/670,400, filed May 11, 2018, both of which are incorporated by reference in their entirety herein.

BACKGROUND

Automotive manufacturers are continuing to reduce the weight of passenger cars to meet the increasing government regulations on fuel efficiency and reducing emissions. The structural body of a vehicle, commonly known as the body-in-white (BIW), is a vehicle's largest structure, and therefore ideal for weight reduction considerations. BIW refers to the welded sheet metal components that form the vehicle structure to which the other components will be connected, i.e., the engine, the chassis, the exterior and interior trim, the seats, etc. Reducing body weight, however, must be carefully balanced with desired body stiffness and strength, a key characteristic which influences vehicle dynamics, durability, and crash worthiness.

There accordingly remains a need to provide a lighter BIW with suitable mechanical properties.

BRIEF DESCRIPTION

In an embodiment, an article of manufacture comprising a polyester composition comprises, as measured by differential scanning calorimetry with a heating rate of 20° C. per minute on first heating according to ASTM D3418, at least two different crystalline melting temperatures, wherein a first crystalline melting temperature and a second crystalline melting temperature are each independently 200-290° C.; and a first heat of fusion and a second heat of fusion that are each independently at least 3 J/g, preferably wherein a ratio of the first heat of fusion to the second heat of fusion is 1:5-5:1, wherein the polyester composition comprises a first polyester having a phosphorous content of greater than or equal to 20 ppm, a second polyester, and 5-50 weight percent of a plurality of fibers, based on the total weight of the polyester composition, wherein the plurality of fibers have a diameter of 5-25 micrometers.

A polyester prepreg comprises the article described herein. A polyester composite is produced by consolidating the polyester prepreg, preferably in the form of a laminate, produced by consolidating at least two, more preferably from two to one hundred layers of the polyester prepreg under heat and pressure.

A polymer reinforcement comprises the article describe herein, wherein the polymer reinforcement has a hollow multi-chambered structure having a hexagonal geometry. A structural body comprises a hollow component comprising walls that define a channel having a major axis; and the polymer reinforcement, wherein the polymer reinforcement is located in the channel, and wherein the hollow multi-chambered structure comprises secondary channels that are oriented perpendicular or parallel to the major axis.

A method of manufacturing the polyester composite comprises coating a substrate with a blend comprising the first polyester and the second polyester to form a coated substrate, wherein the substrate comprises the plurality of fibers; heating the coated substrate at a first temperature to form a polyester prepreg; layering a plurality of polyester prepregs; and heating the plurality of polyester prepregs at a second temperature under pressure to form the polyester composite.

The above described and other features are exemplified by the following detailed description, drawings, examples, and claims.

DETAILED DESCRIPTION

Figure 1:
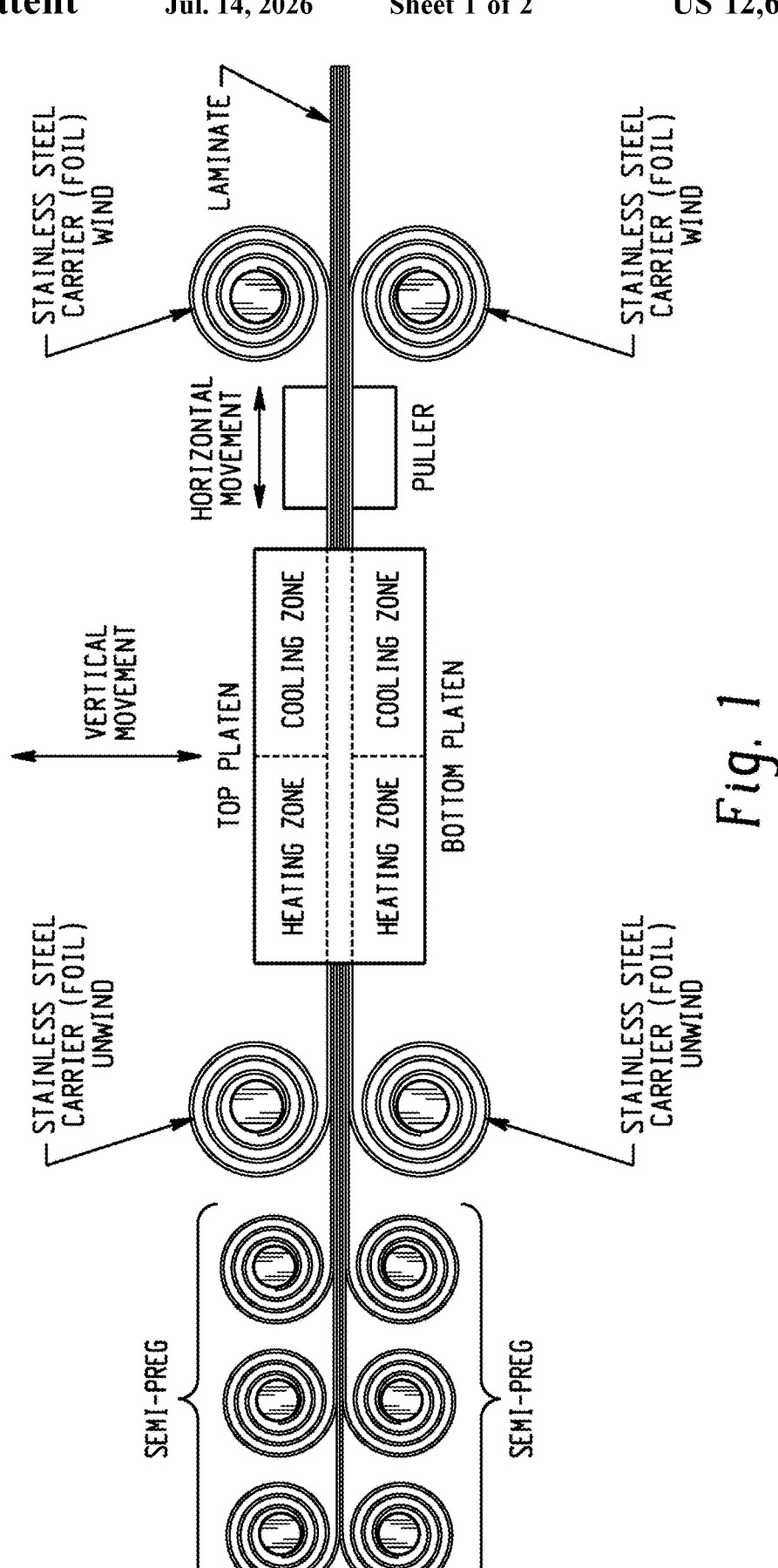
FIG. 1 is a schematic representation of a method of forming a consolidated laminate according to the semi-continuous melt process.

Employed throughout a vehicle are hollow metal structural elements (e.g., beams, rails, pillars, rockers, bars, or the like). The wall thickness of each element is sufficient to impart the desired structural integrity to that element to meet its desired function and various regulatory requirements. Plastic reinforcement has been used in the structural body of a vehicle, e.g., plastic reinforced hollow metal parts of a motor vehicle. This hybrid metal-plastic solution provides a deformable unit comprising a metal channel with plastic reinforcement (e.g., localized plastic reinforcement). The hybrid metal-plastic reinforcement may also include a thermoplastic polyester having chopped glass that is reinforced with a metal and a continuous fiber resin impregnated fabric, tape, or combination thereof. In some instances, localized plastic multi-chambered reinforcement can be used to provide structural integrity to the hollow metal component.

It has been discovered that an external chamber manufactured from a composition comprising polyester components and a plurality of fibers can be used as an alternative to the hollow metal parts of BIW structures. The external chamber made of this composition can provide sufficient strength and the internal multi-chambered structure can prevent the external chambers from collapsing and losing stiffness and strength. The overall plastic-plastic structure therefore provides similar structural integrity with a lighter weight design. Combinations of polymer compositions each having different reinforcing fiber length may also be co-joined with each other, through for example, lamination, gluing, over molding or the like, to provide articles with improved structural characteristics. These structural polyester constructions combine expansive possibilities for part design and speed of manufacturing of injection molding techniques with the structural modulus and strength benefits of long fiber reinforced compositions. The use of thermoplastic polyesters, for example PET, also can allow for the incorporation of post-consumer (PCR) recycled materials and end of life recovered polyester resins from fiber, film and packaging operations to be reused in various applications.

Thermoplastic polyester blends can be less sensitive to moisture compared to high heat nylon materials commonly used for the multi-chambered reinforcements. The improved moisture performance can provide these load-bearing parts with more consistent properties in conditions of varying moisture exposure. In another instance, it can also allow these load bearing structures to be less sensitive to the dynamic environmental conditions. In yet another instance, reinforced polyester load-bearing structures can provide better performance during random vibrations of a vehicle because they are heavier than the high heat glass filled nylon.

Provided herein is an article that includes a polyester composition comprising first and second polyester components and a plurality of fibers. The use of the reinforced polyester blend provides for an article that is capable of withstanding high heat exposure for an extended period of time with good retention of mechanical properties and shape. For example, articles including the polyester composition can have the heat capability to withstand automotive painting operations, such as E-coat painting at 180-220° C. The polyester compositions can further incorporate additives, for example to provide flame retardancy that is suitable for use in vehicles. For example, improved flame retardancy and ignition resistance may be important in electric vehicles, where the greater weight of electric vehicles can also make the polyester compositions especially useful.

The polyester composition includes a first polyester and a second polyester different from the first polyester. The weight ratio between the first polyester and the second polyester can be varied based on the desired properties of the polyester composition. For example, the weight ratio of the first polyester to the second polyester is 80:20 to 20:80, or preferably 60:40 to 40:60. For example, the weight ratio is 75:25 to 25:75, 70:30 to 30:70, 65:35-35:65, 55:45 to 45:55, or 50:50.

The polyester composition can include 10-60 weight percent (wt %), preferably 20-50 wt % of the first polyester, based on the total weight of the polyester composition. The polyester composition can include 10-85 wt %, preferably 20-60 wt % of the second polyester, based on the total weight of the polyester composition. For example, the polyester composition can include 20-50 wt % of the first polyester and 20-60 wt % of the second polyester, each based on the total weight of the polyester composition.

The first polyester and/or the second polyester can be a poly(alkylene terephthalate). The first polyester and/or the second polyester can each comprise, independently, one or more poly(alkylene terephthalate)s. The alkylene group of the poly(alkylene terephthalate) can comprise 2-18 carbon atoms. Exemplary alkylene groups include ethylene, 1,3-propylene, 1,4-butylene, 1,5-pentylene, 1,6-hexylene, 1,4-cyclohexylene, 1,4-cyclohexanedimethylene, or a combination thereof. For example, the alkylene group is ethylene, 1,4-butylene, or a combination thereof.

The poly(alkylene terephthalate) can be a copolyester derived from terephthalic acid (or a combination of terephthalic acid and up to 10 mol % of isophthalic acid) and a mixture comprising a linear $C_2$-$C_6$ aliphatic diol, such as ethylene glycol or 1,4-butylene glycol), and a $C_6$-$C_{12}$ cycloaliphatic diol, such as 1,4-cyclohexane diol, 1,4-cyclohexanedimethanol, dimethanol decalin, dimethanol bicyclooctane, 1,10-decane diol, or a combination thereof. The ester units comprising the two or more types of diols can be present in the polymer chain as random individual units or as blocks of the same type of units. Exemplary esters include poly(1,4-cyclohexylene dimethylene co-ethylene terephthalate) wherein greater than 50 mol % of the ester groups are derived from 1,4-cyclohexanedimethanol; and poly(ethylene-co-1,4-cyclohexylenedimethylene terephthalate) wherein greater than or equal to 50 mol % of the ester groups are derived from ethylene.

The poly(alkylene terephthalate) s can include up to 10 wt %, preferably up to 5 wt % of residues of monomers other than alkylene diols and terephthalic acid. For example, the poly(alkylene terephthalate) can include the residue of isophthalic acid or units derived from an aliphatic acid, such as succinic acid, glutaric acid, adipic acid, pimelic acid, 1,4-cyclohexanedicarboxylic acid, or a combination thereof.

The poly(alkylene terephthalate) can be, but is not limited to, poly(ethylene terephthalate), poly(butylene terephthalate), poly(ethylene naphthanoate), poly(butylene naphthanoate), poly(cyclohexanedimethanol terephthalate), poly (propylene terephthalate), or a combination thereof. In some embodiments, the poly(alkylene terephthalate) is poly(ethylene terephthalate), poly(butylene terephthalate), or a combination thereof. For example the poly(alkylene terephthalate) comprises poly(butylene terephthalate). In an aspect, the first polyester comprises a first poly(butylene terephthalate) and a second poly(butylene terephthalate), and the second polyester comprises poly(ethylene terephthalate).

Dicarboxylic acids (e.g., aliphatic dicarboxylic acids, alicyclic dicarboxylic acids, aromatic dicarboxylic acids, and combinations thereof) and diols (e.g., aliphatic diols, alicyclic diols, aromatic diols, and combinations thereof) can be used to prepare the polyesters. Chemical equivalents of dicarboxylic acids (e.g., anhydrides, acid chlorides, acid bromides, carboxylate salts, or esters) and chemical equivalents of diols (e.g., esters, preferably $C_1$-$C_8$ esters such as acetate esters) may also be used to prepare the polyesters.

Exemplary aromatic dicarboxylic acids include isophthalic acid, terephthalic acid, 1,2-di(p-carboxyphenyl) ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used. The weight ratio of isophthalic acid to terephthalic acid may be, for example, 91:9 to 2:98, or 25:75 to 2:98. Dicarboxylic acids containing fused rings that can be used to prepare the polyesters include 1,4-, 1,5-, and 2,6-naphthalenedicarboxylic acids. Exemplary cycloaliphatic dicarboxylic acids include, decahydronaphthalene dicarboxylic acids, norbornene dicarboxylic acids, bicyclooctane dicarboxylic acids, and 1,4-cyclohexanedicarboxylic acids.

Exemplary aliphatic diols include 1,2-ethylene glycol, 1,2- and 1,3-propylene glycol, 2,2-dimethyl-1,3-propane diol, 2-ethyl-2-methyl-1,3-propane diol, 1,3- and 1,5-pentane diol, dipropylene glycol, 2-methyl-1,5-pentane diol, 1,6-hexane diol, dimethanol decalin, dimethanol bicyclooctane, 1,4-cyclohexane dimethanol and its cis- and trans-isomers, triethylene glycol, 1,10-decane diol, and the like, and combinations thereof. The diol can be ethylene glycol with 0.5 to 5 wt % of diethylene glycol. Exemplary aromatic diols include resorcinol, hydroquinone 1,5-naphthalene diol, 2,6-naphthalene diol, 1,4-naphthalene diol, 4,4'-dihydroxybiphenyl, bis(4-hydroxyphenyl)ether, bis(4-hydroxyphenyl) sulfone, or the like, and combinations thereof.

The poly(alkylene terephthalate) can be a poly(1,4-butylene terephthalate) obtained by polymerizing a glycol component comprising at least 70 mol %, preferably at least 80 mol %, of tetramethylene glycol (1,4-butanediol), and an acid component comprising at least 70 mol %, preferably at least 80 Mol %, of terephthalic acid or polyester-forming derivatives thereof. Commercial examples of PBT include those available as VALOX 315 and VALOX 195 Resin (manufactured by SABIC).

The poly(alkylene terephthalate) can include a modified poly(butylene terephthalate), that is derived in part from poly(ethylene terephthalate) recycled PET, e.g., from used soft drink bottles. The PET-derived PBT polyester ("modified PBT") can be derived from a poly(ethylene terephthalate) component such as poly(ethylene terephthalate), a poly(ethylene terephthalate) copolymer, or a combination thereof. The modified PBT can further be derived from biomass-derived 1,4-butanediol, e.g., corn-derived 1,4-butanediol or a 1,4-butanediol derived from a cellulosic material. Unlike conventional molding compositions containing virgin PBT (PBT that is derived from 1,4-butanediol and terephthalic acid monomers), the modified PBT contains units derived from ethylene glycol and isophthalic acid. Use of modified PBT can provide a valuable way to effectively use underutilized scrap PET (from post-consumer or post-industrial streams) in PBT thermoplastic molding compositions, thereby conserving non-renewable resources and reducing the formation of greenhouse gases, e.g., carbon dioxide.

Commercial examples of modified PBT resins include those available under the trade name VALOX iQ Resin (manufactured by SABIC). The modified PBT can be derived from the poly(ethylene terephthalate) component by depolymerization of the poly(ethylene terephthalate) component and polymerization of the depolymerized poly(ethylene terephthalate) component with 1,4-butanediol to provide the modified PBT.

The composition can comprise a combination of virgin poly(alkylene terephthalate) and modified poly(alkylene terephthalate), including a combination of virgin and modified poly(1,4-butylene terephthalate), the latter obtained from recycled PET.

The composition can include one or more liquid crystalline polyesters (LCP), for example those derived from aromatic hydroxycarboxylic acids, aromatic dicarboxylic acids, aromatic diols, or a combination thereof. Aromatic hydroxycarboxylic acids can include p-hydroxybenzoic acid, 6-hydroxy-2-naphthoic acid, or the like. Aromatic dicarboxylic acids include naphthalene dicarboxylic acid, biphenyl dicarboxylic acid, terephthalic acid, or the like. Aromatic diols include 4,4'-dihydroxybiphenyl or the like.

The polymer composition can comprise 10-60 wt %, preferably 20-50 wt % of the first polyester that is a poly(ethylene terephthalate) and 10-85 wt %, preferably 20-60 wt % of the second polyester that is a poly(butylene terephthalate), each based on the total weight of the polyester composition. For example, the second polyester comprises a first poly(butylene terephthalate) and a second poly(butylene terephthalate), wherein the first and second poly(butylene terephthalates) are different from each other. The intrinsic viscosity of the first poly(butylene terephthalate) can be different than an intrinsic viscosity of the second poly(butylene terephthalate). The weight average molecular weight ($M_w$) of the first poly(butylene terephthalate) can be different than the $M_w$ of the second poly(butylene terephthalate). For example, both the intrinsic viscosity and the $M_w$ can be different.

The polyesters can be obtained by interfacial polymerization or melt-process condensation, by solution phase condensation, or by transesterification polymerization wherein, for example, a dialkyl ester such as dimethyl terephthalate can be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end use of the composition.

A catalyst component facilitates the reaction, and can be selected from antimony compounds, tin compounds, cobalt compounds, titanium compounds, combinations thereof as well as many other metal catalysts and combinations of metal catalysts that have been disclosed in the literature. The amount of the catalyst will vary depending on the specific need at hand. Suitable amounts of the catalyst range from 1 to 5,000 ppm by weight.

The polyester composition, and the article comprising the polyester composition, can have at least two different crystalline melting temperatures when measured by differential scanning calorimetry (DSC) with a heating rate of 20° C. per minute on first heating according to ASTM D3418. The melting temperature, or melting point, refers to the temperature of the peak minima relative to the DSC baseline for the melting (endothermic) peak in a DSC thermogram when the polyester composition or article is heated. The melting point of can be represented by one point even when it is obtained from a composition including multiple components. If two or more peaks appear in the DSC thermogram, the melting temperatures are the temperatures of the peak minima for each melting peak. The term "peak" means that portion of a heating curve that is attributable to a single process, e.g., melting of a specific component or molecular portion of a composition. The peaks can be sufficiently close to one another that one peak has the appearance of a shoulder of the curve defining the other peak, but they are still regarded as separate peaks, because they represent melting points of distinct processes.

The first and second polyesters in the polyester composition can retain their distinct crystallinities as shown by separate melting temperatures. For example, the polyester composition or article can have at least two different crystalline melting temperatures on first heating. The first crystalline melting temperature and the second crystalline melting temperature each can be independently 200-290° C. For example, the first crystalline melting temperature can be 200-260° C., preferably 200-250° C., more preferably 210-240° C.; and the second crystalline melting temperature can be 240-290° C., preferably 245-290° C., more preferably 250-290° C.

The polyester composition or article can have two heats of fusion (enthalpy of fusion) upon first heating, each corresponding to one of the melting temperatures. The first heat of fusion and the second heat of fusion each can be independently at least 3 Joules per gram (J/g), preferably 3-40 J/g, more preferably 6-40 J/g, even more preferably 9-40 J/g. The ratio of the first heat of fusion to the second heat of fusion can be 1:5-5:1, preferably 1:4-4:1, more preferably 1:3-3:1.

The polyester composition, and the article comprising the polyester composition, can have at least two different crystallization temperatures when measured DSC with a cooling rate of 20° C./minute on first cooling according to ASTM D3418. The crystallization temperature refers to the temperature of the peak maxima relative to the DSC baseline for the crystallization (exothermic) peak in a DSC thermogram when the polyester composition or article is cooled after a first heating. The crystallization point of can be represented by one point even when it is obtained from a composition including multiple components. If two or more peaks appear in the DSC thermogram, the crystallization temperatures are the temperatures of the peak maxima for each crystallization peak. The peaks can be sufficiently close to one another that one peak has the appearance of a shoulder of the curve defining the other peak, but they are still regarded as separate peaks, because they represent crystallization points of distinct processes.

The polyester composition or article can have at least two different crystallization temperatures on first cooling. The first crystallization temperature and the second crystallization temperature each can be independently 180-290° C. For example, the first crystallization temperature can be 190-270° C. and the second crystallization temperature is 200-260° C. The second crystallization temperature can be greater than the first crystallization temperature. For example, the first crystallization temperature can be 180-230° C., preferably 200-230° C., more preferably 210-225° C.; and the second crystallization temperature can be 225-290° C., preferably 240-270° C., more preferably 240-250° C.

The polyester composition or article can have two heats of crystallization (enthalpy of crystallization) upon first cooling, each corresponding to one of the crystallization temperatures. The first heat of crystallization and the second heat of crystallization each can be independently –3 J/g or less, preferably –3 to –40 J/g, more preferably –6 to –40 J/g, even more preferably –9 to –40 J/g. The ratio of the first heat of crystallization to the second heat of crystallization can be 1:5 to 5:1, preferably 1:4 to 4:1, more preferably 1:3 to 3:1.

The first polyester can have a phosphorous content of greater than or equal to 20 ppm by weight, for example 20-200 ppm, preferably 20-100 ppm, more preferably 20-60 ppm. For example, the first polyester can be a poly(ethylene terephthalate) having a phosphorous content of 20-200 ppm, preferably 20-100 ppm, more preferably 20-60 ppm. Without being bound by theory, a phosphorous content of greater than or equal to 20 ppm inhibits transesterification between the first and second polyesters at elevated temperatures. Transesterification to form a copolymer can reduce the rate of crystallization and also can lead to post molding dimensional stability issues. Additionally, a phosphorous compound can stabilize melt viscosity and deactivate polymerization catalysts.

The polyester (e.g., poly(alkylene terephthalate)) can have an intrinsic viscosity of 0.4-2.0 deciliter/gram (dl/g), as measured in a 60:40 phenol/tetrachloroethane mixture at 25° C. For example, the polyester can have an intrinsic viscosity of 0.5-1.5 dl/g, preferably 0.6-1.2 dl/g), as measured in a 60:40 phenol/tetrachloroethane mixture at 25° C.

The first polyester and the second polyester have different intrinsic viscosities. For example, the second polyester can include a first poly(butylene terephthalate) and a second poly(butylene terephthalate), wherein the intrinsic viscosity of the first poly(butylene terephthalate) is different than the intrinsic viscosity of the second poly(butylene terephthalate), preferably wherein the first poly(butylene terephthalate) has an intrinsic viscosity of 0.6-0.8 dl/g and the second poly(butylene terephthalate) has an intrinsic viscosity of 1.0-1.4 dl/g), each as measured in a 60:40 phenol/tetrachloroethane mixture at 25° C.

The polyester (e.g., poly(alkylene terephthalate)) can have a weight average molecular weight ($M_w$) of 10,000-200,000 grams per mole (g/mol), preferably 50,000-150,000 g/mol, as measured by gel permeation chromatography (GPC) using polystyrene standards. If a poly(alkylene terephthalate) having a $M_w$ of less than 10,000 g/mol is used, the mechanical properties of the articles molded from the polyester composition can be unsatisfactory. On the other hand, if a poly(alkylene terephthalate) having a $M_w$ of greater than 200,000 g/mol is used, the moldability can be insufficient. The poly(alkylene terephthalate) can also comprise a mixture of two or more poly(alkylene terephthalate) s having different intrinsic viscosities and/or $M_w$.

For example, the first polyester can have a $M_w$ of 15,000-80,000 g/mol, and for example, the first polyester can be a poly(ethylene terephthalate) having a $M_w$ of 15,000-80,000 g/mol.

The polyester (e.g., poly(alkylene terephthalate)) can have a the carboxylic COOH end group (CEG) content of 1-70 millimole equivalents per kilogram (meq/kg), preferably 5-60 meq/kg, more preferably 10-50 can have a CEG content of greater than 20 meq/kg, preferably 20-70 meq/kg, more preferably 20-60 meq/kg. For example, the first polyester can be a poly(ethylene terephthalate) having a CEG content of greater than 20 meq/kg, preferably 20-70 meq/kg, more preferably 20-60 meq/kg.

The polyester (e.g., poly(alkylene terephthalate)) can have a hydroxy OH end group (HEG) content of 1-70 meq/kg, preferably 5-60 meq/kg, more preferably 10-50 meq/kg, as determined, for example by infrared spectroscopy, or according to ASTM D4273. For example, the first polyester can have an HEG content of greater than 20 meq/kg, preferably 20-70 meq/kg, more preferably 20-60 meq/kg. For example, the first polyester can be a poly (ethylene terephthalate) having an HEG content of greater than 20 meq/kg, preferably 20-70 meq/kg, more preferably 20-60 meq/kg.

In an aspect, the polyester has a CEG content of 1-70 meq/kg and a HEG content of 1-70 meq/kg. The ratio of HEG to CEG can be at least 1.3:1, for example 1.3:1, 1.2:1, or 1.1:1. For example, the first polyester can be a pol (ethylene terephthalate) having a CEG content of 1-70 meq/kg and a HEG content of 1-70 meq/kg, wherein the ratio of HEG to CEG is at least 1.3:1, for example 1.3:1, 1.2:1, or 1.1:1.

The polyester can further include a metal content of greater than 10 ppm but less than 200 ppm by weight, wherein the metal is titanium, zirconium, zinc, antimony, germanium, cobalt, tin, or a combination thereof. For example, the first polyester can be a poly(ethylene terephthalate) having a metal content of greater than 10 ppm but less than 200 ppm, for example 10-180 ppm, wherein the metal is titanium, zirconium, zinc, antimony, germanium, cobalt, tin, or a combination thereof. The polyester can have less than 1 ppm of lead, mercury, arsenic, cadmium, thallium, or a combination thereof.

The polyester composition further includes a plurality of fibers. For example, the polyester composition can include 5-50 wt %, preferably 10-50 wt %, more preferably 20-50 wt %, even more preferably 30-50 wt % of the plurality of fibers based on the total weight of the polyester composition.

The plurality of fibers can comprise a chopped glass fiber, long glass fiber, glass filament, woven glass fiber, carbon fiber, woven carbon fiber, ceramic fiber, or a combination thereof. The fiber material can have a melting point that is greater than or equal to the processing conditions of the polyester composition, for example 200-380° C.

The glass fiber can be E, A, C, ECR, R, S, D, or NE glass, or the like, or a combination thereof. The glass fibers can be made by standard processes, e.g., by steam or air blowing, flame blowing, and mechanical pulling. Exemplary glass fibers are made by mechanical pulling.

The glass fibers can be sized or unsized. Sized glass fibers are coated on their surfaces with a sizing composition selected for compatibility with the polyester components. The sizing composition facilitates wet-out and wet-through of the polyesters upon the fiber strands and assists in attaining desired physical properties in the polyester composition. Exemplary coating agents include amino, epoxy, amide, or mercapto functionalized silanes. Organometallic coupling agents, for example, titanium, or zirconium based organometallic compounds, can also be used. For example, the glass fiber can be sized with a coating agent, wherein the coating agent is present in an amount from 0.1-5 wt %, preferably 0.1-2 wt %, based on the weight of the glass fibers. Fiber coating is preferred to provide better handling of the chopped glass and adhesion to the polyester, thereby providing superior mechanical properties.

In preparing the glass fibers, a number of filaments can be formed simultaneously, sized with the coating agent, and then bundled into what is called a strand. Alternatively the strand itself may be first formed of filaments and then sized. The amount of sizing employed is any amount sufficient to bind the glass filaments into a continuous strand, for example from 0.1-5 wt %, preferably 0.1-2 wt %, based on the weight of the glass fibers.

The plurality of fibers comprises glass fiber, carbon fiber, ceramic fiber, or a combination thereof. The fiber can be continuous or chopped. Fibers in the form of chopped strands can have a length of 0.3 millimeters (mm) to 10 centimeters (cm), preferably 0.5 mm to 5 cm, preferably 1.0 mm to 2.5 cm. For example, the fiber can have a length from 0.2-20 mm, preferably 0.2-10 mm, more preferably 0.7-7 mm. The fibers can have any cross-section, such as a round (or circular), flat, or irregular cross-section. For example, the fiber has a circular cross-section. The diameter of the fiber can be from 1-25 micrometers ($\mu$m), preferably 3-20 $\mu$m, more preferably 4-18 $\mu$m, even more preferably 5-17 $\mu$m. For example, the fiber can be a short glass fiber having a diameter of 10 $\mu$m. Flat glass or bilobe fibers can be used to provide, for example, low warp-high strength articles.

The plurality of fibers can be provided in the form of monofilament or multifilament fibers and can be used either alone or in combination with other types of fiber, for example, co-weaving or core/sheath, side-by-side, orange-type or matrix and fibril constructions, or by other methods including those known to one skilled in the art of fiber manufacture. Exemplary co-woven structures include glass fiber-carbon fiber, carbon fiber-aromatic polyimide (aramid) fiber, aromatic polyimide fiberglass fiber, or the like. Fibrous fillers can be in the form of rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Filaments can be made by standard processes, e.g., by steam or air blowing, flame blowing and mechanical pulling. The preferred filaments for plastic reinforcement are made by mechanical pulling. For achieving optimal mechanical properties fiber diameter between 6-20 micrometers can be used with a diameter of from 10-15 micrometers being preferred. In preparing the polyester compositions it is convenient to use the fiber in the form of chopped strands of from about 1/8" (3 mm) to about 1/2" (13 mm) long although roving can also be used. In articles molded from the polyester compositions, the fiber length is typically shorter presumably due to fiber fragmentation during compounding of the composition. The length of such short fibers present in articles can be less than about 4 mm.

For example, long fibers can be used, wherein a continuous fiber bundle containing thousands of fiber monofilaments having a diameter in the range, 6-24 micrometers, preferably 8-18 micrometers is impregnated with a melted polyester blend. After cooling, the impregnated bundle is cut into pellets having a length of >5 mm, specifically, above >9 mm, as prepared by the application of a process known as the pullout or pultrusion process. The length of long fiber present in a molded composition prepared by this method is typically greater than that prepared by incorporation of short fibers and predominant portion of the long fibers present have a length >4 mm in the molded part. Such long fiber reinforced compositions can be used for different molding techniques such as injection molding, compression molding, thermoforming, or the like. As in the case of short fibers, the long fibers can also be treated with a variety of sizing and/or coupling agents to improve adhesion to resin. A continuous process such as pushtrusion for direct incorporation of long fibers in high flow polyester composition is also possible. The fibers can be blended first with the polyester blend and then fed to an extruder and the extrudate cut into pellets, or they can be separately fed to the feed hopper of an extruder. The fibers can be fed downstream in the extruder to minimize attrition of the plurality of fibers. The extruder can be maintained at a temperature of 230-280° C. The pellets so prepared when cutting the extrudate can be one-fourth inch long or less. Such pellets contain finely divided uniformly dispersed fibers. The dispersed fibers are reduced in length as a result of the shearing action on the chopped strands in the extruder barrel.

Exemplary ceramic fibers include metal oxides, metal carbides, metal nitrides, metal hydroxides, metal oxides having hydroxide coatings, metal carbonitrides, metal oxynitrides, metal borides, metal borocarbides, or the like, or a combination thereof. Metal cations can be transition metals, alkali metals, alkaline earth metals, rare earth metals, or the like, or a combination thereof.

The polyester composition can include one or more additives ordinarily incorporated into polymer compositions of this type, with the proviso that the additive(s) are selected so as to not significantly adversely affect the desired properties of the polyester composition. Such additives can be mixed at a suitable time during the mixing of the components for forming the composition. Additives include fillers, reinforcing fillers, antioxidants, impact modifiers, heat stabilizers, light stabilizers, ultraviolet (UV) light stabilizers, plasticizers, stabilizers such as epoxide and polyepoxide, lubricants, mold release agents, antistatic agents, colorants such as carbon black, cobalt, and organic dyes, surface effect additives, radiation stabilizers, flame retardants, and anti-drip agents. A combination of additives can be used, for example a combination of a mold release agent, a stabilizer, and a nucleant. The additives are used in the amounts known to be effective. For example, the total amount of the additives can be 0.01-10 wt %, based on the total weight of the polyester composition.

Exemplary impact modifiers can be one or more materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers.

A specific type of impact modifier is an elastomer-modified graft copolymer comprising (i) an elastomeric (i.e., rubbery) polymer substrate having a $T_g$ less than 10° C., more preferably less than −10° C., or more preferably −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene or styrene; or a combination thereof. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, preferably methyl methacrylate.

Specific elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). For example, the impact modifier can be an alkyl (meth)acrylate copolymer, (meth)acrylic ester-butadiene-styrene, acrylonitrile-butadiene-styrene, styrene-butadiene, styrene-ethylene-butylene-styrene, a poly(ether ester) block copolymer, a polyethylene-α olefin copolymer, styrene-isoprene-styrene triblock copolymer, or a combination thereof.

Impact modifiers can be present in amounts of 1-30 wt %, preferably 1-20 wt %, more preferably 1-15 wt %, based on the total weight of the polymer composition.

Reinforcing fillers can include glass spheres such as hollow and solid glass spheres, silicate spheres, or the like; kaolin, including hard kaolin, soft kaolin, calcined kaolin, kaolin comprising various coatings known in the art to facilitate compatibility with the polymer matrix, or the like; flaked fillers such as glass flakes, flaked silicon carbide, aluminum oxides, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), liquid crystal polyesters (LCP), polyethylene, aromatic polyamides, aromatic polyimides, polyetherimides, polytetrafluoroethylene, or the like; as well as mica, clay, feldspar, fillite, quartz, quartzite, perlite, tripoli, diatomaceous earth, carbon black, or the like, or a combination thereof. In some embodiments, for example when used as a less isotropic filler, the reinforcing filler includes milled glass, glass flakes, glass or ceramic bubbles, and glass spheres may also be used as less isotropic fillers. The polyester composition can include a combination of glass fiber and a platy filler such as glass flake, mica, or a combination thereof. Without being bound by theory, combinations of glass fiber with platy fillers may be beneficial in producing molded articles with greater strength and less warp, and with better flatness and improved dimensional stability over use of cylindrical glass fibers.

Heat stabilizer additives include organophosphites (e.g. triphenyl phosphite, tris-(2,6-dimethylphenyl) phosphite, tris-(mixed mono- and di-nonylphenyl) phosphite, or the like), phosphonates (e.g., dimethylbenzene phosphonate or the like), or a combination thereof.

There is considerable overlap among plasticizers, lubricants, and mold release agents, which include, for example, glycerol tristearate (GTS), phthalic acid esters (e.g, octyl-4,5-epoxy-hexahydrophthalate), tris-(octoxycarbonylethyl) isocyanurate, tristearin, di- or polyfunctional aromatic phosphates (e.g, resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); esters, for example, fatty acid esters (e.g, alkyl stearyl esters, such as, methyl stearate, stearyl stearate, and the like), alkyl amides, such as ethylene bis stearamide (EBS), waxes (e.g, beeswax, montan wax, paraffin wax, or the like), or a combination thereof. In a particular embodiment, the mold release agent is linear low density polyethylene (LLDPE).

The polyester composition can further include an antioxidant or stabilizer, for example hindered phenol, phosphite, phosphonite, thioester, or a combination thereof. Stabilizers or antioxidants include phosphites such as tris(nonyl phenyl) phosphite, tris(2,4-di-t-butylphenyl) phosphite, bis(2,4-di-t-butylphenyl) pentaerythritol diphosphite, distearyl pentaerythritol diphosphite, trilauryl phosphite, trioctadecyl phosphite, diisodecyl pentaerythritol diphosphite, tristearyl sorbitol triphosphite, and tetrakis(2,4-di-tert-butylphenyl)-4,4'-biphenylene diphosphonite; phosphonites such as tetrakis (2,4-di-tert-butylphenyl) 4,4'-biphenylene diphosphonite; sterically hindered phenols such as octadecyl-3,5-di-t-butyl-4-hydroxy hydrocinnamate, tetrakis [methylene (3,5-di-tert-butyl-4-hydroxyhydrocinnamate)]methane, 1,3,5-tris(3,5-di-t-butyl-4-hydroxybenzyl)-s-triazine-2,4,6 (1H,3H, 5H)trione, 1,3,5-trimethyl-2,4,6-tris(3,5-di-t-butyl-4-hydroxybenzyl)benzene, and bis(3,3-bis(4-hydroxy-3-t-butylphenyl) butanoic acid)glycol ester; thioesters such as bis-dodecyl 3,3'-thiodipropionate, bis-octadecyl 3,3'-thiodipropionate, dimyristyl thiodipropionate, ditridecyl thiodipropionate, mixed esters (lauryl and stearyl) of thiodipropionic acid, pentaerythritol tetrakis(3-(dodecylthio) propionate), and thioesters of di-, tri- or tetra-carboxylic acids; phosphonates such as dimethylbenzene phosphonate or the like, organic phosphates such as trimethyl phosphate; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; amides of beta-(3,5-di-tert-butyl-4-hydroxyphenyl)-propionic acid, or a combination thereof. The polyester composition can include 0.01-0.5 wt %, preferably 0.01-0.3 wt % of the antioxidant or stabilizer, based on the total weight of the polyester composition.

Additives used to enhance polyester crystallization, such as alkaline and alkaline earth carboxylates, for example sodium stearate, potassium oleate, or calcium stearate, and talc, alone or in combination, can be included in the polyester composition. Without being bound by theory, faster crystallization can result in molded articles with better and more consistent properties, and that can be prepared using shorter, more efficient, molding cycles.

Exemplary flame retardants include organic compounds that include phosphorus, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri (nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include polyphosphazenes, red phosphorous, phosphorus ester amides, phosphoric acid amides, phosphonic acid amides, phosphinic acid amides, and tris(aziridinyl) phosphine oxide.

Halogenated materials can also be used as flame retardants, for example bisphenols such as 2,2-bis-(3,5-dichlorophenyl)-propane; bis-(2-chlorophenyl)-methane; 1,2-bis-(2,6-dichlorophenyl)-ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as oligomeric and polymeric halogenated aromatic compounds, such as a copolycarbonate of bisphenol A and tetrabromobisphenol A and a carbonate precursor, e.g., phosgene. In some embodiments non-halogenated flame retardants are used. Metal synergists, e.g., antimony oxides, can also be used with the flame retardant.

Alternatively, the polyester composition can be essentially free of chlorine and bromine, which is defined herein as having a bromine or chlorine content of 100 ppm or less, 75 ppm or less, or 50 ppm or less, based on the total weight of the polyester composition.

Anti-drip agents can also be used in the composition, for example a fibril forming or non-fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion.

A thermoplastic polymer different from the first and second polyesters can be present. Exemplary thermoplastic polymers include poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylene sulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl) methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polytriazines, polyureas, or a combination thereof. In an aspect, no additional thermoplastic polymer is present.

The polyester composition can be free of polyvinyl chloride (PVC) or other aliphatic chlorinated polymers. For example, the polyester composition includes less than 0.1 wt % of PVC based on the total weight of the polyester composition. For example, the polyester includes a PCR PET with less than 0.1 wt % of PVC.

The polyester composition can be free of titanium dioxide (e.g., includes less than 0.1 ppm of $TiO_2$). Without being bound by theory, small amounts of harder minerals (e.g., Mohs hardness >5.0) can cause breakage of glass fibers resulting in reduced mechanical properties.

The method of preparing the polyester composition can be carried out using any technique. One convenient method comprises blending the polyesters, reinforcing filler, inorganic filler, and other optional ingredients in powder or granular form, extruding the blend under temperature sufficient to melt the polyesters, and comminuting into pellets or other suitable shapes. The ingredients are combined in any usual manner, e.g., by dry mixing or by mixing in the melted state in an extruder, on a heated mill or in other mixers.

Illustrative examples of equipment used in such melt processing methods include co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between 230° C. and 350° C. in the molten polyester composition, although higher temperatures can be used provided that the residence time of the polyesters in the processing equipment is kept short. In some embodiments the melt processed polyester composition exits processing equipment such as an extruder through small exit holes in a die. The resulting strands of molten resin are cooled by passing the strands through a water bath. The strands can be cut into pellets and further dried before molding.

Also provided is an article comprising the polyester composition. The polyester composition can be molded into useful shaped articles by a variety of means such as injection molding, extrusion, rotational molding, blow molding, and thermoforming. For example, good results are obtained in an injection molding machine, e.g. of the 80 ton Van Dorn type, with temperatures that depend on the particular polyester blends utilized. If necessary, depending on the molding properties of the polyesters, the amount of additives, and the rate of crystallization of the polyester component, those skilled in the art will be able to make the necessary adjustments in molding cycles to accommodate the polyester compositions.

The articles including the polyester composition can have a tensile modulus of at least 6,000 MPa, preferably 6,000-24,000 MPa, as measured at 23° C. with a crosshead speed of 50 mm per minute according to ASTM D638.

The articles including the polyester composition can have a tensile strength at yield of at least 70 MPa, preferably 70-180 MPa, as measured at 23° C. with a crosshead speed of 50 mm per minute according to ASTM D638.

The articles including the polyester composition can have a heat deflection temperature (HDT) of at least 180° C., preferably 180-220° C., as measured at 0.45 MPa according to ASTM D648.

The articles including the polyester composition can have a melt volume flow rate (MVR) of 10-80 cubic centimeters per 10 minutes (cc/10 min), as measured at 265° C. with a 2.16 kg loading for 6 minutes according to ASTM D1238.

The article including the polyester composition can have one or more of a tensile modulus of 6,000-24,000 MPa, a tensile strength at yield of 70-180 MPa, an HDT of 180-220° C., and/or an MVR of 10-80 cc/10 min. For example, the article including the polyester composition can have a tensile modulus of 6,000-24,000 MPa, a tensile strength at yield of 70-180 MPa, an HDT of 180-220° C., and an MVR of 10-80 cc/10 min.

Also provided herein is a polyester prepreg comprising the article disclosed herein. The prepreg can be prepared in any form, where the form is generally dictated by the shape of the plurality of fibers. For example, a fabric or a continuous fiber tow, or tows, can provide a layer of fiber material. Where a fiber tow comprising continuous, unidirectional fibers is pre-impregnated, the prepreg is generally referred as a unidirectional tape. The thickness of such layers or tapes can vary widely, for example from 5 micron to 1 mm, and even higher, for example, up to 2 mm.

Composites can be prepared by consolidation of the polyester prepregs by methods known in art. For example, laminates can be prepared by contacting at least two layers of a prepreg under conditions of heat and pressure sufficient to consolidate the prepreg. Effective temperatures can include 225-550° C., at pressures from 20-2000 PSI, for example. A laminate can include at least two, preferably from two to one hundred layers of the polyester prepreg. All of the layers of the laminate are formed from the polyester prepreg, or the laminate can comprise other layers, for example a different prepreg. Alternatively, all of the prepreg layers used to form the laminate can be the polyester prepregs produced as described herein.

A method of manufacturing the polyester composite is also provided. The method includes coating a substrate with a blend comprising the first polyester and the second polyester to form a coated substrate, wherein the substrate comprises the plurality of fibers. The coated substrate is then heated at a first temperature to form a polyester prepreg. A plurality of polyester prepregs can then be layered and heated at a second temperature under pressure to form the polyester composite.

A non-prepreg layer can be present such as a release layer, a copper foil, or an adhesive to enhance bonding between two layers. The adhesive can be applied using any method, for example, spreading, spraying, and dipping. The adhesive can be any adhesive that provides the desired adhesion between layer(s) of the prepregs or tapes. An adhesive can be polyvinylbutyral (PVB), ethylene-vinyl acetate copolymer (EVA), an epoxy, an ultraviolet (UV) or water-curable adhesive such as a silicone, cyanoacrylate or other acrylic, or a combination comprising at least one or the foregoing.

The prepreg can be a tape that includes a plurality of unidirectional fibers, preferably continuous unidirectional fibers. In forming laminates from the tapes, the continuous unidirectional fiber-reinforced polyester tapes can be oriented with substantially parallel fibers, where the fibers of one layer are parallel, or more parallel man perpendicular with the fibers of another layer. Alternatively, the continuous unidirectional fiber-reinforced polyester tapes can be oriented with substantially non-parallel fibers, where the fibers of one layer are less parallel than perpendicular with the fibers of another layer. In other embodiments, the continuous unidirectional fiber-reinforced polyester tapes are oriented with substantially non-parallel fibers, substantially parallel fibers, or a combination including at least one of the foregoing.

The polyester composite, in particular the laminate, can be thermoformed, for example, vacuum thermoformed, to form a shape.

The polyester composite, in particular a unidirectional fiber reinforced polyester composite, can have one or more of a flexural strength in the machine direction and transverse direction, independently, of greater than 20 MPa, preferably 20-60 MPa, wherein the ratio of the flexural strength in the machine direction to the flexural strength in the transverse direction is less than 2:1, as measured according to ASTM D7264; flexural modulus in the machine direction and transverse direction, independently, of greater than 200 GPa, preferably 200-600 GPa, wherein the ratio of the flexural modulus in the machine direction to the flexural modulus in the transverse direction is less than 2:1, as measured according to ASTM D7264; a fiber volume fraction of 15-80%, preferably 25% to 70%; and/or an average density of 1.3-2.4 $g/cm^3$, preferably 1.4-2.2 $g/cm^3$, as measured according to ASTM D792.

The polyester composite can have any dimensions based on the desired use. For example, the polyester composite can have a total thickness of 1-30 mm, preferably 2-25 mm, more preferably 2-20 mm. Alternatively, the composite can have length 10-300 mm, preferably 20-250 mm, more preferably 20-200 mm. The composite can have a width of 10-300 mm, preferably 20-250 mm, preferably 20-200 mm. Preferably the length and the width are the same or different, and are each independently at least one order of magnitude greater (i.e., ten times greater) than the total thickness.

The composite can have a thickness of 1-30 mm, a length of 10-300 mm, and a width of 10-300 mm. For example, the composite can have a thickness of 2-25 mm, a length of 20-250 mm, and a width of 20-250 mm. For example, the composite can have a thickness of 2-20 mm, a length of 20-200 mmm, and a width of 20-200 mm. In yet another example, the composite can have a thickness of 1-5 mm and a length and width that are each independently 10-200 mm. For example, the composite can have a thickness of 1-3 mm and a length and width that are each independently 10-100 mm.

Also provided is a plastic reinforcement comprising the article as described herein. The plastic reinforcement can have a hollow multi-chambered structure with a hexagonal geometry. A structural body can include a hollow component comprising walls that define a channel having a major axis and the plastic reinforcement. For example, the plastic reinforcement can be located in the channel and the internal chamber structure comprises secondary channels that are oriented perpendicular or parallel to the major axis. For example, the plastic wall of the hollow component can comprise the plastic reinforcement. The structural body can include a first plastic reinforcement and a second plastic reinforcement, where the walls of the hollow component comprise the first plastic reinforcement and the internal chambers comprise the second plastic reinforcement. For example, the walls of the hollow component can have a thickness that is 2 to 20 mm. The wall thickness can vary along the major axis of the channel.

The plastic reinforcement can have a hollow multi-chambered structure having multiple, interconnected internal chambers, also be referred to as "honeycomb" (e.g., an array of columns and channels). The internal chambers of the structure can be any polygonal or rounded shape, such as circular, oval, square, rectangular, triangular, diamond, pentagonal, hexagonal, heptagonal, octagonal geometries, or a combination thereof. The plastic reinforcement can include a plurality of interconnected internal chambers that are the same or different, each independently having, for example, 3 to 12 sides and a chamber wall thickness of 2 to 10 mm. In other embodiments, the chamber wall thickness is less than or equal to the thickness of the walls of the hollow component. For example, the hollow component can have an open structure on one external side, such as a C-channel construction with a plurality of interconnected internal chambers.

The hollow component can have an open structure on two external sides, for example an H- or I-beam cross section with a plurality of interconnected internal chambers. The internal chambers can be made by bonding extruded plastic tubes together, injection molding the material for the internal chambers, extruding the internal chamber structure, among other methods. For example, the plastic reinforcement can be a co-extruded component having internal chambers of the same or different material, i.e., adjacent internal structures can have a different material composition. Optionally, some or all of the internal structures have foam therein. In other words, the internal structures can, individually, be hollow or filled, such that the structural integrity can be modified by filling particular internal structures, by using different plastic for particular internal structures, or a combination thereof. A possible fill material can be foam, for example, a polyurethane foam.

This disclosure is further illustrated by the following examples, which are non-limiting.

Examples

The materials used for the examples are provided in Table 1. The amount of materials in the formulations is given in weight percent unless otherwise indicated.

TABLE 1

| Material | Description | Source |
|---|---|---|
| PBT-1 | Poly(butylene terephthalate) with an intrinsic viscosity of 0.66 dl/g as measured in phenol/ tetrachloroethane (60:40) at 25° C., 17 meq/ Kg COOH, $T_m$ 215° C., weight average molecular weight = 53,400 g/mol, <10 ppm P (available under the trade name VALOX 195). | SABIC |
| PBT-2 | Poly(butylene terephthalate) with an intrinsic viscosity of 1.2 dl/g as measured in phenol/ tetrachloroethane (60:40) at 25° C., 38 meq/ Kg COOH, $T_m$ 217° C., weight average molecular weight = 110,000 g/mol, <10 ppm P (available under the trade name VALOX 315). | SABIC |
| PET | Poly(1,2-ethylene terephthalate), intrinsic viscosity of 0.535 dl/g as measured in phenol/ tetrachloroethane (60:40) at 25° C., having 0.8 wt % of diethylene glycol (DEG), 20 meq/Kg COOH, $T_m$ 245° C., >20 ppm P (available under the trade name ARRAY 30161). | DAK Americas |
| GF | Glass fibers, 10 micrometer diameter PBT chopped glass fiber, CAS Reg. No. 65997-17-3. | PPG Ind. |
| Long GF | Long glass fibers, 16 micrometer diameter fiber with a 2200 g/km Tex and a roving yield strength of 225 yd/lb (available under the trade name TUFROV 4588). | PPG Ind. |
| Talc | Talcum, $Mg_3Si_4O_{10}(OH)_2$ having an average particle size of 1 micrometer, CAS Reg. No. 14807-96-6. | Imerys |

TABLE 1-continued

| Material | Description | Source |
|---|---|---|
| EBS wax | Ethylene bis stearamide, CAS Reg. No. 110-30-5 (tradename ACROWAX C). | BASF |
| AO | Pentaerythritol tetrakis(3-(3,5-di-tert-butyl-4-hydroxyphenyl)propionate), CAS Reg. No. 6683-19-8 (trade name IRGANOX 1010). | Addivant |
| Olefin wax | Polyolefin and wax mixture (the tradename COMBOLOOB 609) | Rheochem Honeywell |
| DPIDP | Diphenyl isodecyl phosphite, CAS Reg. No. 26544-23-0 | Addivant |
| CB | Carbon Black-PBT 25:75 (weight ratio) | SABIC |

Samples were prepared as follows. The components were pre-mixed in a paint shaker and then extruded under a minimal vacuum on a 30 mm co-rotating twin screw extruder. The Extrusion conditions are shown in Table 2. Resultant pellets were dried for 3-4 hours at 120° C. in a forced air-circulating oven. The compositions were not pre-dried prior to extrusion. Injection molding using the resultant pellets was performed on an 80 ton van Dorn injection molding machine at 240-265° C.

TABLE 2

| | | |
|---|---|---|
| Zone 1 Temp | ° C. | 200 |
| Zone 2 Temp | ° C. | 240 |
| Zone 3 Temp | ° C. | 260 |
| Zone 4 Temp | ° C. | 260 |
| Zone 5 Temp | ° C. | 250 |
| Die Zone Temp | ° C. | 250 |
| Screw speed | rpm | 300 |

All molded parts were conditioned for at least 40 hours (hrs) at 50% relative humidity before testing. Melt volume flow rate (MVR) was measured according to ASTM D1238 at 265° C. with a 2.16 kg loading for 6 or 18 minutes. Carboxylic end group (CEG) concentration was determined by a general equivalence-point titration according to ASTM D7409-15 by titration with 0.01 N-tetrabutylammonium hydroxide/2,2,2-trifluoroethanol. Hydroxy end-group (HEG) concentration was determined using Fourier transform infrared (FTIR) spectroscopy. Gel permeation chromatography (GPC) was performed by dissolving samples in a mixture of hexafluoroisopropanol (HFIP) and chloroform (1:19 by volume) and analyzed using an Agilent model 1260 GPC instrument equipped with a PL HFIP gel column (300 mm×4.6 mm) and a UV detector, and molecular weights were reported relative to polystyrene by using a calibration curve based on monodisperse polystyrene standards. Specific gravity (Sp. G.) was measured per ASTM D 792 on injection molded samples. Notched Izod impact (NI) was measured at 23° C. as per ASTM D256 on 3.2 mm thick bars using a 10 lb. hammer. Tensile properties were measured on 3.2 millimeter type I bars as per ASTM method D638 at 23° C. with a crosshead speed of 5 mm/min as tangent. Tensile strength is measured at yield. Flexural modulus and strength were determined in the machine direction (MD) and transverse direction (TD) for the fiber-reinforced polyester tapes according to ASTM D7264. The average density of the fiber-reinforced polyester tapes was determined according to ASTM D792.

Crystallinity, melting, and solidification were measured by differential scanning calorimetry (DSC) with a heating rate of 20° C./min. as per ASTM D3418-15. On the first heating the sample is examined to determine if any cold crystallization (incomplete crystallization of the sample, Tc1) was present. The sample was then heated to melting and the temperature of the separate polyester melting peaks were recorded in degrees centigrade (Tm1) and the approximate heat of fusion (dH-M1) measured in J/g. The molten sample was then cooled at 120° C./min and the heat of crystallization (solidification) was recoded as a peak temperature (Tc) and a heat of crystallization (dH-Tc) noted. The sample was then heated a second time and the melting point (Tm2) and heat of fusion (dH-M2) were recorded. The PET-PBT articles showed two separate melting peaks for each polyester on first and second heatings, however crystallization (solidification) occurred in the same region as a broader unresolved peak.

Heat deflection temperature (HDT) was measured per ASTM D648 at 0.45 MPa (66 psi) or 1.82 MPa (264 psi) stress with a heating rate of 120° C./hr using a 3.2 mm thick injection molded bar. Glass transition temperature ($T_g$) was determined by solid state rheology (dynamic mechanical analysis, DMA) with the modulus as function of temperature at a constant frequency of 1 Hertz (Hz) and a flex mode with a 3° C./min heating rate. Heat sag was performed on a 19×3.2 mm tensile bars clamped at the gate end with 3.8 mm supported and 13.9 cm overhang (knock out pins facing down, flat side up) heating to 200 and 220° C. for 2 hours allowing the bars to sag under their own weight.

PET was analyzed for the elements of interest, including phosphorous, cobalt, and antimony, using inductively coupled plasma-optical emission spectrometry (ICP-OES). Each sample was prepared for ICP-OES analysis by acid digestion in an Anton-Paar microwave oven. A two-step, acid digestion was performed in which the sample was first charred in concentrated (95%) sulfuric acid and then fully digested by addition of concentrated nitric acid or 30% hydrogen peroxide to the microwave sample vessel. The resulting solution was then diluted to a fixed volume using deionized water and analyzed using an Agilent ICP-OES instrument to quantify the elements of interest relative to the starting sample weight.

Table 2 shows the crystallinity, melting, and solidification properties as measured by DSC, and the elemental analysis (metals content) was determined by ICP-OES for the PET used in the examples. The Tm1 for PET was slightly higher than observed for the PET component in the PET-PBT blends.

TABLE 2

| PET Metals Content | | |
|---|---|---|
| Phosphorous | ppm | 40 |
| Cobalt | ppm | 13 |
| Antimony | ppm | 179 |
| Zinc | ppm | 3 |
| PET DSC | | |
| Tc1 | ° C. | 132 |
| dH-Tc1 | J/g | −27 |
| Tm1 | ° C. | 257 |
| dH-M1 | J/g | 39 |
| Tg | ° C. | 83 |
| Tc2 | ° C. | 186 |
| dH-TC2 | J/g | −38 |
| Tm2 | ° C. | 256 |
| dH-M2 | J/g | 36 |

Chopped Glass Fiber

Articles were prepared from the combination of PBT and PET with 30-40 wt % of chopped glass fiber as Examples 1-5 and Comparative Example 1 (Table 3). The weight ratio of PET to PBT was varied from 33:67-57.8:42.2. The blend further comprised a small particle sized talc for nucleation and EBS wax lubricant for crystal growth and mold release. The compositions are provided in Table 3 with the components expressed in weight percent (wt %).

TABLE 3

| Component | C1 | E1 | E2 | E3 | E4 | E5 |
|---|---|---|---|---|---|---|
| PBT-1 | 51.4 | 34.4 | 25.7 | 21.7 | 23.4 | 20 |
| PBT-2 | 12.8 | 8.6 | 6.4 | 5.4 | 5.8 | 5 |
| PET | — | 21.2 | 32.1 | 37.1 | 40.0 | 34.2 |
| GF | 35 | 35 | 35 | 35 | 30 | 40 |
| Talc | 0.5 | 0.5 | 0.5 | 0.5 | 0.5 | 0.5 |
| EBS wax | 0.3 | 0.3 | 0.3 | 0.3 | 0.3 | 0.3 |
| Total PET (wt %) | 0 | 33 | 50 | 57.8 | 57.8 | 57.8 |

The properties of Examples 1-5 and Comparative Example 1 are provided in Table 4. Multiple entries for melting temperature (Tm1 and/or Tm2) and heat of fusion (dH-M1 and/or dH-M2) indicates the values for first and second peaks. On the first heating, no initial crystallization (Tc1) was observed.

TABLE 4

| Property (units) | C1 | E1 | E2 | E3 | E4 | E5 |
|---|---|---|---|---|---|---|
| MVR at 6 min (cc/10 min) | 35.4 | 29.8 | 36.2 | 34.8 | 37.3 | 34.2 |
| Tc1 (° C.) | — | — | — | — | — | — |
| dH (J/g) | — | — | — | — | — | — |
| Tm1 (° C.) | 224 | 222/255 | 222/256 | 221/255 | 222/256 | 222/256 |
| dh-M1 (J/g) | 27 | 18/11 | 11/16 | —/31 | 10/21 | 9/19 |
| Tc2 (° C.) | 201 | 192 | 203 | 206 | 205 | 205 |
| dH-TC (J/g) | −30 | −27 | −28 | −28 | −30 | −28 |
| Tm2 (° C.) | 223 | 213/240 | 212/243 | 212/244 | 213/245 | 212/244 |
| dH-M2 (J/g) | 31 | 7/22 | 8/25 | 7/15 | 7/21 | 8/14 |
| Sp. G. (g/cc) | 1.6080 | 1.6033 | 1.6095 | 1.6240 | 1.5752 | 1.6679 |
| Tensile Modulus (MPa) | 8,612 | 8,676 | 8,006 | 7,926 | 6,908 | 9,590 |
| Tensile Strength (MPa) | 101 | 100 | 97 | 94 | 89 | 101 |
| Un-notched Izod (J/m) | 549 | 450 | 483 | 346 | 357 | 506 |
| Flexural Modulus (MPa) | 8,190 | 8,140 | 7,440 | 7,460 | 6,430 | 8,940 |
| Flexural Strength (MPa) | 161 | 151 | 142 | 135 | 131 | 148 |
| Tg by DMA (° C.) | 65 | 74 | 78 | 79 | 77 | 77 |
| HDT at 0.45 MPa (° C.) | 215 | 210 | 194 | 199 | 189 | 208 |
| Vicat (° C.) | 219 | 218 | 222 | 223 | 224 | 225 |
| Heat sag at 220° C. (mm) | 19 | 18 | 18 | 17 | 24 | 12 |

Examples 1-5 show that the combination of PET with faster crystallizing, lower heat PBT and additional nucleants and plasticizers/lubricants provides molded articles having good dimensional stability including a tensile strength at yield of greater than 80 MPa, and a flexural strength of greater than 120 MPa, and high heat resistance (HDT>180° C.). Surprisingly, the PET and PBT did not undergo significant transesterification during the two heat histories of extrusion and molding, as each component retained as found to retain its own crystallization behavior. Examples 1-5 show one broad endotherm on solidification (Tc2) and two distinct separate melting points for each polyester (Tm1 and Tm2) on both first and second heating. Without being bound by theory, transesterification is believed to be inhibited by the >20 ppm phosphorous content of the PET.

The inclusion of PET is desirable for its higher melting point (ca. 245° C.), better mechanical properties, and ready availability as a post-consumer recycle stream compared to PBT. PET is relatively slower to crystallize from the melt in rapid manufacturing practices such as injection moldings. Incomplete crystallization of the PET can result in articles that undergo additional crystallization during use or assembly. This additional crystallization can lead to shrinkage causing part distortion such as warping giving poor fit in end use. A mixture of high and low molecular weight PBT (PBT-1 and PBT-2) allowed the melt viscosity of the resultant GF-PET-PBT blend to be adjusted to meet the need of specific molding conditions giving higher or lower melt flow as desired.

Examples 6-8 are articles prepared from the combination of PBT and PET with 35 wt % of chopped glass fiber. The weight ratio of PET to PBT was varied from 30:70 to 80:20. The blend further comprised a small particle talc for nucleation and EBS wax lubricant for crystal growth and mold release.

The compositions of Examples 6-8 are provided in Table 5 with the components expressed in weight percent (wt %).

TABLE 5

| Component | E6 | E7 | E8 |
|---|---|---|---|
| PBT-1 | 27.0 | 15.4 | 7.7 |
| PBT-2 | 18.0 | 10.3 | 5.1 |
| PET | 19.2 | 38.5 | 51.4 |
| GF | 35 | 35 | 35 |
| Talc | 0.5 | 0.5 | 0.5 |
| EBS wax | 0.3 | 0.3 | 0.3 |
| Total PET (wt %) | 30 | 60 | 80 |

The properties of Examples 6-8 are provided in Table 6. Multiple entries for melting temperature (Tm1 and/or Tm2) and heat of fusion (dH-M1 and/or dH-M2) indicates the values for first and second peaks.

TABLE 6

| Property (units) | E6 | E7 | E8 |
|---|---|---|---|
| MVR at 6 min (cc/10 min) | 22.4 | 24.6 | 27.7 |
| MVR at 18 min (cc/10 min) | 31.2 | 30.9 | 31.2 |
| % change from 6-18 min | 39.3% | 25.6% | 12.6% |
| Tc1 (° C.) | — | — | — |
| dH (J/g) | — | — | — |
| Tm1 (° C.) | 222/255 | 221/256 | 223/255 |
| dh-M1 (J/g) | 11/21 | 9/21 | 3/29 |
| Tc2 (° C.) | 192 | 205 | 208 |
| dH-TC (J/g) | −28 | −30 | −23 |
| Tm2 (° C.) | 214/230 | 225/244 | 222/247 |
| dH-M2 (J/g) | 10/18 | 6/23 | 4/25 |

TABLE 6-continued

| Property (units) | E6 | E7 | E8 |
|---|---|---|---|
| Sp. G. (g/cc) | 1.6077 | 1.6260 | 1.6259 |
| Tensile Modulus (MPa) | 9,046 | 8,847 | 8,450 |
| Tensile Strength (MPa) | 106 | 104 | 103 |
| Un-notched Izod (J/m) | 8,574 | 8,296 | 7,929 |
| Flexural Modulus (MPa) | 156 | 150 | 147 |
| Flexural Strength (MPa) | 69 | 76 | 79 |
| Tg by DMA (° C.) | 214 | 204 | 195 |
| HDT at 0.45 MPa (° C.) | 163 | 87 | 72 |
| Vicat (° C.) | 219 | 232 | 243 |
| Heat sag at 200° C. (mm) | 1 | 3 | 3 |
| Heat sag at 220° C. (mm) | 24 | 18 | 11 |

In Examples 6 and 7, cold crystallization was not observed based on the absence of Tc1. Example 8, which had a higher PET content, showed a small amount of cold crystallization (Tc1), which can lead to post molding dimensional stability issues. The volume melt flow (MVR) at 260° C. increased by less than 40% in Example 6 and by less than 30% in Examples 7 and 8, after an additional 12 minutes at 260° C. The results show that a higher PET content improves melt stability.

Long Glass Fiber

Articles prepared from the combination of PBT and PET with 35 and 50 wt % of long chopped glass fiber as Examples 9 and 10, respectively. The weight ratio of PET to PBT was 35:65. The articles further comprised carbon black, a hindered phenol antioxidant, olefin wax, and DPIDP. The compositions are provided in Table 7 with the components expressed in weight percent (wt %).

TABLE 7

| Component | E9 | E10 |
|---|---|---|
| PBT-1 | 49.7 | 49.7 |
| PBT-2 | 15.6 | 15.6 |
| PET | 33.2 | 33.2 |
| Carbon black | 1.0 | 1.0 |
| AO | 0.4 | 0.4 |
| DPIDP | 0.05 | 0.05 |
| Olefin wax | 0.1 | 0.1 |
| Long GF | 35 | 50 |
| Total PET (wt %) | 35 | 35 |

The properties of Examples 9 and 10 are provided in Table 8. Multiple entries for melting temperature (Tm1 and/or Tm2) and heat of fusion (dH-M1 and/or dH-M2) indicates the values for first and second peaks.

TABLE 8

| Property (units) | E9 | E10 |
|---|---|---|
| Tc1 (° C.) | — | — |
| dH (J/g) | — | — |
| Tm1 (° C.) | 222/255 | 221/256 |
| dh-M1 (J/g) | 9/23 | 9/21 |
| Tc2 (° C.) | 192 | 200 |
| dH-TC (J/g) | −27 | −28 |
| Tm2 (° C.) | 214/231 | 221/245 |
| dH-M2 (J/g) | 7/18 | 6/21 |

23

TABLE 8-continued

| Property (units) | E9 | E10 |
|---|---|---|
| Tensile Modulus (MPa) | 15,400 | 18,000 |
| Tensile Strength (MPa) | 122 | 135 |
| Flexural Modulus (MPa) | 10400 | 13400 |
| Flexural Strength (MPa) | 175 | 178 |
| Notched Izod (J/m) | 582 | 564 |
| HDT at 1.82 MPa (° C.) | 217 | 219 |

For Examples 9 and 10, a continuous roving of fiber glass was melt impregnated with the 5 PET-PBT formulation (Table 7) and consolidated into a cylindrical strand, cooled in a water batch, and chopped into ~1.5 cm pellets to provide articles having long glass fibers. Suitable methods of melt impregnation of continuous glass roving is described, for example, in US RE 32,722; 4,864,964; 4,939,002 and references therein.

In Examples 9 and 10, the length of the glass fibers can be as long as the extruded pellets, resulting in limited attrition during injection molding into the articles used for analysis. The longer fiber length resulted in better mechanical properties such as improved tensile modulus (≥15000 MPa) and notched Izod impact strength (≥500 J/m), and higher heat under load (HDT>215° C.).

Fiber Glass Laminate Tape

The general procedure includes contacting a woven glass fabric comprising a multi directional weave of 10-12 micrometers of a woven fiber material with a 350 micron ground powder prepared by cryogenic mechanical grinding of the PET-PBT of Example 11. The ground powder was contacted with several ply of the fabric (ca. 320° C.) to form a semi-preg, consolidated by heating under pressure using moving belts, and then cooled to form a PET-PBT glass fabric laminate. The glass fiber was substantially wetted and encapsulated by the molten PET-PBT resin.

Table 9 shows the composition of Example 11 with the components expressed in weight percent (wt %).

TABLE 9

| Component | E11 |
|---|---|
| PBT-1 | 49.45 |
| PBT-2 | 14.7 |
| PET | 33.3 |
| Carbon black | 2.0 |
| AO | 0.4 |
| DPIDP | 0.05 |
| Olefin wax | 0.1 |
| Total PET (wt %) | 34 |

In Examples 12-17, the composition of Example 11 was combined with a woven fiber material to form the fiber glass laminate tapes. Table 10 shows the properties of the woven fiber materials of Examples 12-17.

TABLE 10

| Fabric | FAW (gsm) | Type | EPI × PPI | Weave pattern | RC (wt %) | TAW (gsm) | Density (g/cc) | CPT (mm) | Vf (%) |
|---|---|---|---|---|---|---|---|---|---|
| CF12K5HS | 510 | Carbon | 8 × 8 | 5 HS | 38% | 823 | 1.62 | 0.51 | 56% |
| 7581 Glass | 309 | E-Glass | 58 × 54 | 8 HS | 32% | 454 | 2.00 | 0.23 | 54% |
| EWR800 | 840 | E-Glass | 46 × 39 | Plain | 32% | 1235 | 2.00 | 0.62 | 54% |

24

In Table 10, "FAW" means the fiber areal weight, in grams per square meter (gsm), and is the amount (mass) of woven fiber material within an area unit of the fabric; "EPI" means ends per inch and is the number of threads per inch in the warp direction of woven fabric; "PPI" means pics per inch and is the number of threads per inch of woven fabric in the weft (fill) direction; "Weave pattern" is either plain or harness strain, as provided below; "RC" means the resin content by weight of the composition (resin powder and fabric) of Example 11; "TAW" means the total average weight of the unconsolidated laminate in gsm; "Density" means the density of the pre-preg and is the weight of the woven fabric with resin powder added before consolidation; "CPT" means the cured ply thickness (mm) of the consolidated laminate; and "Vf" means the amount (%) of fiber volume in the consolidated laminate.

Figure 2:
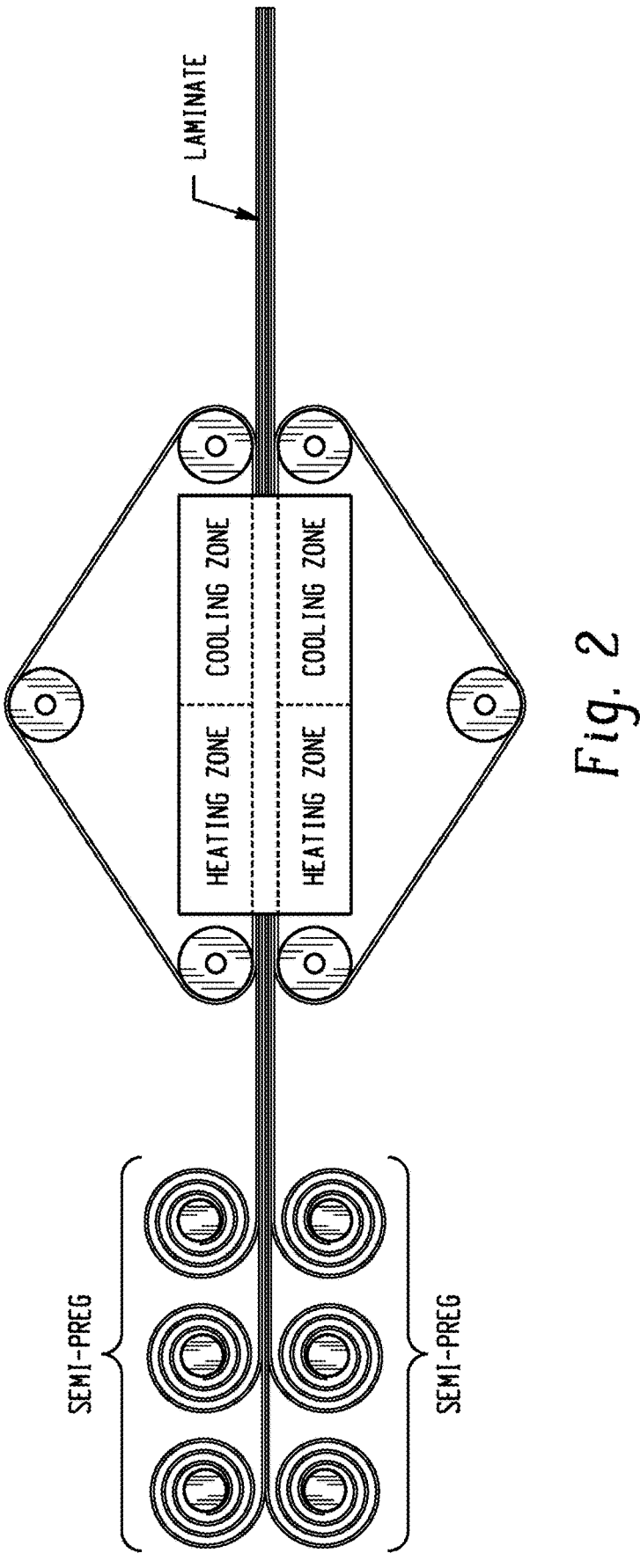
FIG. 2 is a schematic representation of a method of forming a consolidated laminate according to the isochoric double belt melt process.

Examples 12-17 were prepared as follows. The composition of Example 11 was ground into a powder with an average particle size of 350 micrometers and combined with a woven fiber material of Table 10 using a semi continuous melt process (Examples 12, 14, and 16) as shown in FIG. 1 and a continuous isochoric melt process (Examples 13, 15, and 17) as shown in FIG. 2, wherein the temperature for either process is about 320° C. The pre-determined number of fabric layers were put together and then covered with the PET-PBT composition, and the samples were then fed into a semi continuous compression laminator (SC) or a continuous isochroic double belt laminator (CI). In Examples 12-17, the various layers were oriented in the same direction (0 degree alignment), but other directional alignments could be used, for example alternating 90 or 45 degree rotation of layer directions or other alignments. The semi continuous lamination used a constant pressure and allowed the volume of the system to vary as the fabric layers and resin powder were melted and consolidated. The isochroic laminator used a fixed gap with confined edges to achieve a constant volume during fabric consolidation with the molten polyester resin. The consolidated laminates were cooled and cut into test specimens.

Table 11 shows the components and properties for Examples 12-17.

TABLE 11

|  | E12 | E13 | E14 | E15 | E16 | E17 |
|---|---|---|---|---|---|---|
| Laminator type | SC | CI | SC | CI | SC | CI |
| Fabric | 7581 Glass | 7581 Glass | EWR800 | EWR800 | CF12K5HS | CF12K5HS |
| Layers | 9 | 9 | 3 | 3 | 4 | 4 |
| Thickness (mm) | 2.0 | 2.0 | 1.8 | 1.7 | 2.2 | 2.1 |
| Composite density (g/cc) | 2.00 | 2.07 | 2.0 | 2.07 | 1.58 | 1.56 |
| MD Modulus (GPa) | 294 | 367 | 214 | 418 | 281 | 272 |
| TD Modulus (GPa) | 231 | 297 | 129 | 216 | 249 | 258 |
| MD/TD Modulus Ratio | 1.71 | 1.24 | 1.66 | 1.94 | 1.13 | 1.05 |
| MD Strength (MPa) | 23 | 24 | 21 | 24 | 51 | 49 |
| TD Strength (MPa) | 22 | 23 | 14 | 16 | 30 | 26 |
| MD/TD Strength Ratio | 1.05 | 1.04 | 2.10 | 1.50 | 1.70 | 1.88 |

Optical microscopic examination of the cross sections of the resultant laminates showed very good fiber wet out with no voids and excellent single fiber coverage. The thickness of the consolidated laminates varied from 1.7-2.2 mm and the densities varied from 2.00-2.07 g/cc. The CF laminates of Examples 16 and 17 had a lower density (1.58 and 1.56 g/cc, respectively). Drying the composition of Example 12 for 2 hr at 125° C. before consolidation did not give appreciably different values.

The resin content (RC) in the final laminates was 32-38 wt % (Table 10). The tensile properties of the laminates were tested in the machine (MD) and transverse (TD) direction, as per ASTM D7264, and showed a MD modulus of greater than 200 GPA and a MD strength of above 20 MPa. Examples 12, 13, and 15-17 had both MD/TD modulus ratios of less than 2.0 and MD/TD strength ratios of less than 2.0. The laminates prepared using the isochroic double belt process (Examples 13 and 15) had higher modulus values than the laminates from the semi-continuous consolidation process (Examples 12 and 14). The moduli of the CF fabric laminates (Examples 16 and 17) were similar and independent of process.

Complex Channel Parts

Complex multi chambered channel (CMCC) parts were molded using the compositions of Examples 6, 7, or 8. The test parts had the following dimensions: 41 cm long, 5 cm high, and 5 cm wide. The top and bottom of the parts were open hexagonal and trapezoidal channels. The internal chambers comprised 20 alternating rows connecting the two opposite solid sides. The rows were two hexagons with a common side alternating with a central hexagon with two trapezoids fused to the opposite solid sides. The end rows of the parts had a central hexagon with two fused trapezoids on opposite sides of the hexagon. The hexagons had a length of 25 mm and width of 20 mm with the long axis aligned with the length of the complex channel part. The hexagon and trapezoid wall thicknesses were from 2.0-3.5 mm with thicker walls in the middle three hexagonal/trapezoidal rows. The parts had a square cross section perimeter with alternating angular (W/M shaped) connection between the opposite solid sides which were 5 cm high and 3 mm thick.

The complex multi chambered channel parts described above were tested for maximum flexural strength and impact load as molded and after being heat treated (aged) for 30 minutes at 220° C. The heat treated parts were also evaluated for warp. Complex channel maximum flex load was determined as follows. Samples in a test jig (35×10 cm) were subjected to flexural load applied to the center of the sample at 0.5 cm/min to determine the force needed to break the sample. Flex load is reported in pound-force (lbf). Complex channel maximum impact load was determined as follows. Samples of the complex channel geometry as described above were placed on a test jig (35×10 cm) were subjected to impact from a 14 kg load dropped from a height of 39 cm onto the center of the sample. The impact had a 15 cm diameter round tip. Impact load is reported in pound-force (lbf).

Examples 18-20 were also measured for warp after oven aging. After cooling to ambient temperature, the open long side of the part was placed on a flat surface with a force applied to one end. The displacement at the opposite end of the bottom of the part relative to the flat surface was reported as warp (cm).

The compositions and properties of the CMCC parts of Examples 18-20 are shown in Table 12.

TABLE 12

| Composition | E18 Example 6 | E19 Example 7 | E20 Example 8 |
|---|---|---|---|
| Complex channel maximum flex load (lbf) | | | |
| As molded | 592 | 602 | 631 |
| Heat treated | 566 | 571 | 536 |
| Complex channel maximum impact load (lbf) | | | |
| As molded | 1,253 | 1,395 | 1,382 |
| Heat treated | 1,280 | 1,342 | 1,381 |
| Warp after heat treatment (cm) | 0.033 | 0.046 | 0.001 |

Examples 18, 19, and 20 showed a maximum flex loads of over 500 lbf and maximum impact loads of over 1,200 lbf. After heat treatment both of these properties were largely (>80%) retained. The parts also had excellent dimensional stability showing less than 0.05 cm warp.

Hybrid Parts

The PET-PBT-GF laminates of Examples 12-17 can further be bonded to complex injection molded GF-PET-PBT blends comprising a chopped glass, long glass, or mixtures of chopped glass and long glass to form rigid structural parts suitable for vehicle construction. These hybrid parts can also retain their shape after exposure (1-6 h) in high temperature (180-220° C.) ovens used for painting, such as E-coat painting.

The bonding between the laminate and injected molded blends may be achieved by hand lay-up, compression molding, vibration molding, laser welding, injection molding with a laminate insert, or a similar process.

Having a laminate/tape and substrate parts of similar thermoplastic resins and promote good melt adhesion of the materials (like bonded to like) and can also facilitate recovery and reuse of scrap parts or end of life material recovery from the vehicle. The mechanical properties of the hybrid construction combining a complex self-reinforcing injection molded part design overlaid in at least some areas with a continuous fiber laminate or tape can provide strong, light weight parts suitable for construction of light weight vehicles.

For example, strong thermoplastic structural hybrid parts can be made by over-molding the continuous fiber laminates with the short glass or long glass PET-PBT blends to form complex multi chambered channel (CMCC) parts with continuous fiber laminate outer surfaces. One, two, or three of the outer sides of the CMCC parts may be laminate reinforced.

Fabrication can be, for example, achieved by placing any of the laminates of Examples 12-17 into an injection mold and heating while injecting molten plastic; for example the short glass PET-PBT blends or Examples 1-8 or the long glass PET-PBT blends of Examples 9 and 10, forming a complex multi chambered channel part as in Examples 18-20 wherein the laminate is integrally bonded to the CMCC.

This disclosure further encompasses the following aspects.

Aspect 1: An article of manufacture comprising a polyester composition, the article comprising, as measured by differential scanning calorimetry with a heating rate of 20° C. per minute on first heating according to ASTM D3418, at least two different crystalline melting temperatures, wherein a first crystalline melting temperature and a second crystalline melting temperature are each independently 200-290° C.; and a first heat of fusion and a second heat of fusion that are each independently at least 3 J/g, preferably wherein a ratio of the first heat of fusion to the second heat of fusion is 1:5-5:1, wherein the polyester composition comprises a first polyester having a phosphorous content of greater than or equal to 20 ppm, a second polyester, and 5-50 weight percent of a plurality of fibers, based on the total weight of the polyester composition, wherein the plurality of fibers have a diameter of 5-25 micrometers.

Aspect 2: The article of aspect 1, further comprising, as measured by differential scanning calorimetry with a cooling rate of 20° C. per minute on first cooling according to ASTM D3418, at least two different crystallization temperatures, wherein a first crystallization temperature and a second crystallization temperature are each independently 180-290° C., preferably wherein the second crystallization temperature is 225-290° C. and is greater than the first crystallization temperature; and a first heat of crystallization and a second heat of crystallization that are each independently −3 J/g or less, preferably wherein a ratio of the first heat of crystallization to the second heat of crystallization is 1:5 to 5:1:

Aspect 3. The article of aspect 1 or aspect 2, wherein the article has one or more of a tensile modulus of at least 6,000 MPa, preferably 6,000-24,000 MPa, as measured at 23° C. with a crosshead speed of 50 mm per minute according to ASTM D638; a tensile strength at yield of at least 70 MPa, preferably 70-180 MPa, as measured at 23° C. with a crosshead speed of 50 mm per minute according to ASTM D638; a heat deflection temperature of at least 180° C., preferably 180-220° C., as measured at 0.45 MPa according to ASTM D648; and a melt volume flow rate of 10-80 cubic centimeters per 10 minutes, as measured at 265° C. with a 2.16 kg loading for 6 minutes according to ASTM D1238.

Aspect 4: The article of any one or more of the preceding aspects, wherein the first polyester has a weight-average molecular weight of 15,000-80,000 grams per mole, as measured by gel permeation chromatography using polystyrene standards; a carboxylic COOH end group content of greater than 20 millimole equivalents per kilogram; a hydroxy OH end group content of greater than 20 millimole equivalents per kilogram; a ratio of hydroxy end groups to carboxylic end groups of at least 1.3:1; and a metal content of greater than 10 ppm but less than 200 ppm, wherein the metal is titanium, zirconium, zinc, antimony, germanium, cobalt, tin, or a combination thereof.

Aspect 5: The article of any one or more of the preceding aspects, wherein the polyester composition comprises 10-60 weight percent, preferably 20-50 weight percent of the first polyester, based on the total weight of the polyester composition, wherein the first polyester comprises a poly(ethylene terephthalate); and 10-85 weight percent, preferably 20-60 weight percent of the second polyester, based on the total weight of the polyester composition, wherein the second polyester comprises a poly(butylene terephthalate), preferably wherein the second polyester comprises a first poly(butylene terephthalate) and a second poly(butylene terephthalate), more preferably wherein an intrinsic viscosity of the first poly(butylene terephthalate) is different than an intrinsic viscosity of the second poly(butylene terephthalate); or a weight average molecular weight of the first poly(butylene terephthalate) is different than a weight average molecular weight of the second poly(butylene terephthalate); or both the intrinsic viscosity and the weight average molecular weight are different.

Aspect 6: The article of any one or more of the preceding aspects, wherein the plurality of fibers comprises a plurality of chopped glass fiber, long glass fiber, glass filament, woven glass fiber, carbon fiber, woven carbon fiber, ceramic fiber, or a combination thereof.

Aspect 7: The article of any one or more of the preceding aspects, wherein the polyester composition further comprises 0.01-0.5 weight percent of a stabilizer, based on the total weight of the polyester composition, preferably 0.01-0.3 weight percent of a hindered phenol, phosphite, phosphonite, thioester, or a combination thereof; 0.01-8 weight percent of a nucleant, based on the total weight of the polyester composition, preferably 0.05-5 weight percent of talc, silica, siloxane, clay, alkaline carboxylate salt, or a combination thereof; 0.01-2 weight percent of a mold release agent, based on the total weight of the polyester composition, preferably 0.1-0.8 weight percent of a fatty acid ester, a wax, a polyolefin, or a combination thereof; and 0-5 weight percent of a colorant, based on the total weight of the polyester composition, preferably 0.1-5 weight percent of carbon black, a dye, a pigment, or a combination thereof.

Aspect 8: The article of any one or more of the preceding aspects, wherein the polyester composition further comprises 1-30 weight percent of an impact modifier, based on the total weight of the polyester composition; preferably 1-15 weight percent of an alkyl (meth)acrylate copolymer, (meth)acrylic ester-butadiene-styrene, acrylonitrile-butadiene-styrene, styrene-butadiene, styrene-ethylene-butylene-styrene, a poly(ether ester) block copolymer, a polyethylene-α olefin copolymer, styrene-isoprene-styrene triblock copolymer, or a combination thereof.

Aspect 9: A polyester prepreg comprising the article of any one or more of the preceding aspects.

Aspect 10: A polyester composite produced by consolidating the polyester prepreg of aspect 9, preferably in the form of a laminate produced by consolidating at least two, more preferably from two to one hundred layers of the polyester prepreg under heat and pressure.

Aspect 11: The polyester composite of aspect 10, wherein the prepreg layers are in the form of continuous unidirectional fiber-reinforced polyester tapes.

Aspect 12: The polyester composite of aspect 11, wherein the continuous unidirectional fiber-reinforced polyester tapes are oriented in the same direction and the composite has one or more of flexural strength in the machine direction and transverse direction, independently, of greater than 20 MPa, preferably 20-60 MPa, wherein the ratio of the flexural strength in the machine direction to the flexural strength in the transverse direction is less than 2:1, as measured according to ASTM D7264; flexural modulus in the machine direction and transverse direction, independently, of greater than 200 GPa, preferably 200-600 GPa, wherein the ratio of the flexural modulus in the machine direction to the flexural modulus in the transverse direction is less than 2:1, as measured according to ASTM D7264; a fiber volume fraction of 15-80%, preferably 25-70%; and an average density of 1.3-2.4 grams per cubic centimeter, preferably 1.4-2.2 grams per cubic centimeter, as measured according to ASTM D792.

Aspect 13: A polymer reinforcement comprising the article of any one or more of aspects 1-8, wherein the polymer reinforcement has a hollow multi-chambered structure having a hexagonal geometry.

Aspect 14: A structural body comprising a hollow component comprising walls that define a channel having a major axis; and the polymer reinforcement of aspect 13, wherein the polymer reinforcement is located in the channel, and wherein the hollow multi-chambered structure comprises secondary channels that are oriented perpendicular or parallel to the major axis.

Aspect 15: A method of manufacturing the polyester composite of any one or more of aspects 10-12, the method comprising coating a substrate with a blend comprising the first polyester and the second polyester to form a coated substrate, wherein the substrate comprises the plurality of fibers; heating the coated substrate at a first temperature to form a polyester prepreg; layering a plurality of polyester prepregs; and heating the plurality of polyester prepregs at a second temperature under pressure to form the polyester composite.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. "Combination thereof" is open, and includes combinations of the named items, as well as like items not named.

Unless specified to the contrary herein, all test standards are the most recent standard in effect as of the filing date of this application, or, if priority is claimed, the filing date of the earliest priority application in which the test standard appears. Technical and scientific terms used herein have the same meaning as is commonly understood by one of skill in the art to which this application belongs. All cited patents and patent applications are incorporated herein by reference in their entirety.

Compounds are described using standard nomenclature. As used herein, the terms "hydrocarbyl" and "hydrocarbon" refer to any chemical group comprising hydrogen and carbon. "Alkyl" means a branched or linear (i.e., "straight-chain"), monovalent saturated hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain unsaturated hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent unsaturated hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group. "Aryl" means a monovalent aromatic hydrocarbon group that can be a single ring or multiple rings (e.g., from 1 to 3 rings), which are fused together or linked covalently. "Arylene" means a divalent aryl group. "Alkylarylene" means an arylene group substituted with an alkyl group. "Arylalkylene" means an alkylene group substituted with an aryl group (e.g., benzyl). The term "halo" means a group or compound herein that includes one or more of a fluoro, chloro, bromo, or iodo substituent. A combination of different halo groups (e.g., bromo and fluoro), or only chloro groups can be present. The term "hetero" means that the compound or group herein is a stable group that includes at least one member that is a heteroatom (e.g., 1, 2, or 3 heteroatom(s)), wherein the heteroatom(s) is each independently N, O, S, Si, or P.

Unless substituents are otherwise specifically indicated, each of the foregoing groups can be unsubstituted or substituted, provided that the substituted atom's normal valence is not exceeded and the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g, toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$). When a compound is substituted, the indicated number of carbon atoms is the total number of carbon atoms in the compound or group prior to substitution. For example, $-CH_2CH_2CN$ is a cyano-substituted $C_2$ alkyl group.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polyester composite produced by consolidating a polyester prepreg comprising an article which comprises a polyester composition, wherein the article has, as measured by differential scanning calorimetry with a heating rate of 20° C. per minute on first heating according to ASTM D3418, at least two different crystalline melting temperatures, wherein a first crystalline melting temperature and a second crystalline melting temperature are each independently 200-290° C.; and a first heat of fusion and a second heat of fusion that are each independently at least 3 J/g, and wherein the polyester composition comprises, based on the total weight of the polyester composition, 20 to 50 weight percent of a first polyester having a phosphorous content of greater than or equal to 20 ppm by weight, based on the total weight of the polyester composition, 20 to 60 weight percent of a second polyester, 5 to 50 weight percent of a plurality of fibers, based on the total weight of the polyester composition, wherein the plurality of fibers have a diameter of 5 to 25 micrometers, 0.01 to 0.3 weight percent of a stabilizer, the stabilizer comprising a hindered phenol, phosphite, phosphonite, thioester, or a combination thereof, 0.05 to 5 weight percent of a nucleant, the nucleant comprising talc, silica, siloxane, clay, alkaline carboxylate salt, or a combination thereof, 0.1 to 0.8 weight percent of a mold release agent, the mold release agent comprising a fatty acid ester, a wax, a polyolefin, or a combination thereof, and 0.1 to 5 weight percent of a colorant, the colorant comprising carbon black, a dye, a pigment, or a combination thereof, wherein the polyester composite is produced by consolidating the polyester prepreg in the form of a laminate produced by consolidating at least two layers of the polyester prepreg under heat and pressure, wherein each of the layers of the polyester prepreg comprises a continuous unidirectional fiber-reinforced polyester tape comprising the plurality of fibers or a polyester tape comprising woven glass fabric comprising the plurality of fibers, wherein the first polyester comprises a poly(ethylene terephthalate) and the first polyester has a weight-average molecular weight of 15,000-80,000 grams per mole, as measured by gel permeation chromatography using polystyrene standards;

a carboxylic COOH end group content of 20 to 60 millimole equivalents per kilogram;

a hydroxy OH end group content of 20 to 60 millimole equivalents per kilogram;

a ratio of hydroxy end groups to carboxylic end groups of at least 1.3:1; and a metal content of greater than 10 ppm by weight but less than 200 ppm by weight, wherein the metal is titanium, zirconium, zinc, antimony, germanium, cobalt, tin, or a combination thereof; and wherein the second polyester comprises a first poly(butylene terephthalate) and a second poly(butylene terephthalate), and wherein an intrinsic viscosity of the first poly(butylene terephthalate) is different than an intrinsic viscosity of the second poly(butylene terephthalate); or a weight average molecular weight of the first poly(butylene terephthalate) is different than a weight average molecular weight of the second poly(butylene terephthalate); or both the intrinsic viscosity and the weight average molecular weight are different.

2. The polyester composite of claim 1, wherein the plurality of fibers comprises a plurality of chopped glass fiber, long glass fiber, glass filament, woven glass fiber, carbon fiber, ceramic fiber, or a combination thereof.

3. The polyester composite of claim 1, wherein the polyester composition further comprises 1 to 30 weight percent of an impact modifier, based on the total weight of the polyester composition.

4. The polyester composite of claim 1, wherein each of the layers of the polyester prepreg comprises the continuous unidirectional fiber-reinforced polyester tape.

5. The polyester composite of claim 1, each of the layers of the polyester prepreg comprises the polyester tape comprising woven glass fabric.

6. A method of manufacturing the polyester composite of claim 1, the method comprising coating a substrate with a blend comprising the first polyester and the second polyester to form a coated substrate, wherein the substrate comprises the plurality of fibers;

heating the coated substrate at a first temperature to form a polyester prepreg;

layering a plurality of polyester prepregs; and heating the plurality of polyester prepregs at a second temperature under pressure to form the polyester composite.

7. A method of producing the polyester composite of claim 1, the method comprising:

forming a prepreg by laminating at least two prepreg layers in the form of continuous unidirectional fiber-reinforced polyester tapes;

heating the at least two prepreg layers at a first temperature to form the polyester prepreg;

layering one or more polyester prepregs to form the article; and consolidating the article at a second temperature under pressure to form a polyester composite, wherein the continuous unidirectional fiber-reinforced polyester tapes are oriented in the same direction.

8. A method of producing the polyester composite of claim 1, the method comprising:

forming a prepreg by laminating at least two prepreg layers in the form of polyester tapes comprising woven glass fabric;

heating the at least two prepreg layers at a first temperature to form the polyester prepreg;

layering one or more polyester prepregs to form the article; and consolidating the article at a second temperature under pressure to form a polyester composite.

* * * * *